(12) United States Patent
Fraysse et al.

(10) Patent No.: US 6,397,630 B1
(45) Date of Patent: Jun. 4, 2002

(54) FLOATING MARINE STRUCTURE

(75) Inventors: Philippe Fraysse, Fontenay aux Roses; Etienne Werlen, Versailles, both of (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/673,454

(22) PCT Filed: Apr. 16, 1999

(86) PCT No.: PCT/FR99/00897

§ 371 (c)(1),
(2), (4) Date: Dec. 11, 2000

(87) PCT Pub. No.: WO99/54036

PCT Pub. Date: Oct. 28, 1999

(30) Foreign Application Priority Data

Apr. 17, 1998 (FR) .............................................. 98 04835

(51) Int. Cl.⁷ .................................................. F25J 1/00
(52) U.S. Cl. ...................... 62/643; 240/906; 202/158; 261/112.2
(58) Field of Search .................... 62/240, 643, 906; 261/112.2; 202/158

(56) References Cited

U.S. PATENT DOCUMENTS 4,041,721 A  *  8/1977  Kniel .......................... 62/240
4,311,564 A  *  1/1982  Alridge ..................... 202/158
5,644,932 A      7/1997  Dunbobbin et al.
5,730,000 A  *  3/1998  Sunder et al. ................. 62/906

FOREIGN PATENT DOCUMENTS

| DE | 27 39 627 | 3/1978 |
| EP | 54-72884 | 6/1979 |
| EP | 55-162337 | 12/1980 |
| WO | WO 84/04048 | 10/1984 |

OTHER PUBLICATIONS

B. Hoting et al., XP000555667, "Untersuchungen Zur Fluiddynamik Und Stoffuerbertragung in Extraktions–Kolonennen Mit Strukturierten Packungen Teil I: Fluiddynamisches Verhalen in Abhaengigkeit Von Energieeintrag Und Phasenverhaeltnis", Chemmie. Ingenieur. Technik, vol. 68, pp. 105–109.

* cited by examiner

*Primary Examiner*—Ronald Capossela
(74) *Attorney, Agent, or Firm*—Young & Thompson

(57) ABSTRACT

A floating structure having an oscillation angle i not more than about 10°, bears an air distilling column with corrugated criss-cross packing. The undulating configuration of the corrugated strips of at least one pack is selected such that d/i<0.6, where d is the axis deviation of the cone spreading the liquid, when each pair of adjacent strips of the pack is inclined at an angle i in its general plane.

15 Claims, 2 Drawing Sheets

FLOATING MARINE STRUCTURE

BACKGROUND OF THE INVENTION

The present invention relates to a floating offshore structure such as an offshore oil platform or barge, with an angle of oscillation i at most equal to a predetermined value $i_o$ which is generally between about 5° and 10°.

DESCRIPTION OF THE RELATED ART

As is well known, cross-corrugated packing is used in certain distillation columns in the place of the distillation plates in order to provide for the exchange of material and heat between an ascending gas and a descending liquid. This cross-corrugated packing consists of a superposition of lengths. Each length is formed from a stack of corrugated strips each one arranged in a vertical general plane and one against the next. The corrugations are oblique and descend in opposite directions from one strip to the next.

The strips generally comprise dense small-diameter perforations, with a degree of perforation of about 10%, to allow the liquid to pass through the corrugated strips.

GB-A-1,004,046 and CA-A-1,095,827 describe such cross-corrugated packing.

Cross-corrugated packing is generally made from a flat product, namely from metal sheets in the form of strip. The strips are first of all folded (or bent) to form a corrugated sheet metal strip, the corrugations of which are oblique with respect to the axis of the strip. The folded strips are then cut into lengths and then stacked, turning every alternate strip around. The lengths of packing thus obtained are often called "packs".

WO-A-90/10497 describes, inter alia, a packing similar to the aforementioned cross-corrugated packing but perforated in a different way. The term "cross-corrugated packing" used here also includes such packing, together with any similar packing.

Offshore oil platforms produce residual gases. For economic and environmental reasons, it is becoming increasingly necessary to make profitable use of these gases. One method consists in converting them into heavier hydrocarbons, in the form of a liquid which is therefore more readily transportable, using the Fischer-Tropsch process, which consumes vast amounts of oxygen.

It would therefore be desirable to be able to install a distillation column with cross-corrugated packing on such a floating structure, but serious difficulties are encountered in so doing.

This is because, in cross-corrugated packing, the successive packs are rotated through a certain angle, generally 90°, about the axis of the column from one pack to the next, so as to encourage periodic redistribution of the liquid over the entire cross section of the column.

In consequence, at every moment, the corrugated strips of certain packs at least form an angle of less than 45° with the plane of inclination. For these strips, the inclination i therefore has a substantial component in their general plane, and tends to cause the descending liquid to be deviated. Liquid thus tends to reach the outer shell of the column, and then to trickle down along this shell without playing a part in the distillation. The distillation performance of the column is consequently degraded.

The basic problem that the invention sets out to solve consists in producing a floating marine structure bearing a distillation column with cross-corrugated packing capable of operating satisfactorily in the presence of oscillations due to the heave and the amplitude of which oscillations is typically between 5° and 10°, possibly with a predominant direction of oscillation which is due to the prevailing winds. An essential feature is thus that the liquid distributed at the top of the column should more or less uniformly wet the packing over the entire cross section of the column despite the aforementioned oscillations.

To this end, the subject of the invention is an floating offshore structure such as an offshore oil platform or barge, with an angle of oscillation i at most equal to a predetermined value $i_o$, which is generally between about 5° and 10°, characterized in that it bears a distillation column equipped, over at least part of its length, with a cross-corrugated packing, this packing comprising a superposition of lengths of packing, each of which comprises a stack of vertical corrugated strips with their corrugations alternately inclined in opposite directions, the configuration of the corrugation of the strips of at least one length of packing being chosen to be such that, for each pair of adjacent strips of this length, when the strips are inclined in their general plane by the said angle i, the mean lines of greatest slope of the mean corrugation flanks of the two strips delimit, measuring from any point on the upper edge of the pair of strips, on each side of the perpendicular to this edge at the said point, a flattened cone, the axis of which forms with the said perpendicular an angle d such that the ratio d/i is less than 0.6 and preferably less than 0.5.

SUMMARY OF THE INVENTION

The floating off shore structure thus defined may have one or more of the following characteristics, taken in isolation or in any technically feasible combination:

the mean angular aperture γ of the corrugation and the inclination δ of the generatrices of the corrugations of each of the strips of the said length, when viewed face on, are connected by the following relationship:

$$1 - 2\sin 2\delta \cos^2 \frac{\gamma}{2} \frac{B - \sin^2 \frac{\gamma}{2}}{2B\sqrt{B - A^2}} < 0.6,$$

with: $A = 1 - \cos^2 \delta \cdot \cos^2 \frac{\gamma}{2}$ and: $B = A\left(1 + \sin^2 \frac{\gamma}{2}\right) - \sin^2 \frac{\gamma}{2}$ γ=40° approximately and δ is between about 30° and about 60°, preferably between about 40° and about 60°;

γ=50° approximately and δ is between about 40° and about 60°, preferably between about 50° and about 60°;

γ=60° approximately and δ is between about 40° and about 60°, preferably between about 50° and about 60°;

γ=70° approximately and δ is between about 50° and about 60° and preferably close to 60°.

γ=80° approximately and δ=60° approximately;

the column is a double air distillation column.

BRIEF DESCRIPTION OF THE DRAWINGS

Embodiments of the invention will now be described with reference to the appended drawings, in which:

FIG. 5 depicts a corrugated strip of the packing, seen face on;

DESCRIPTION OF THE PREFERRED EMBODIMENTS

Figure 1:
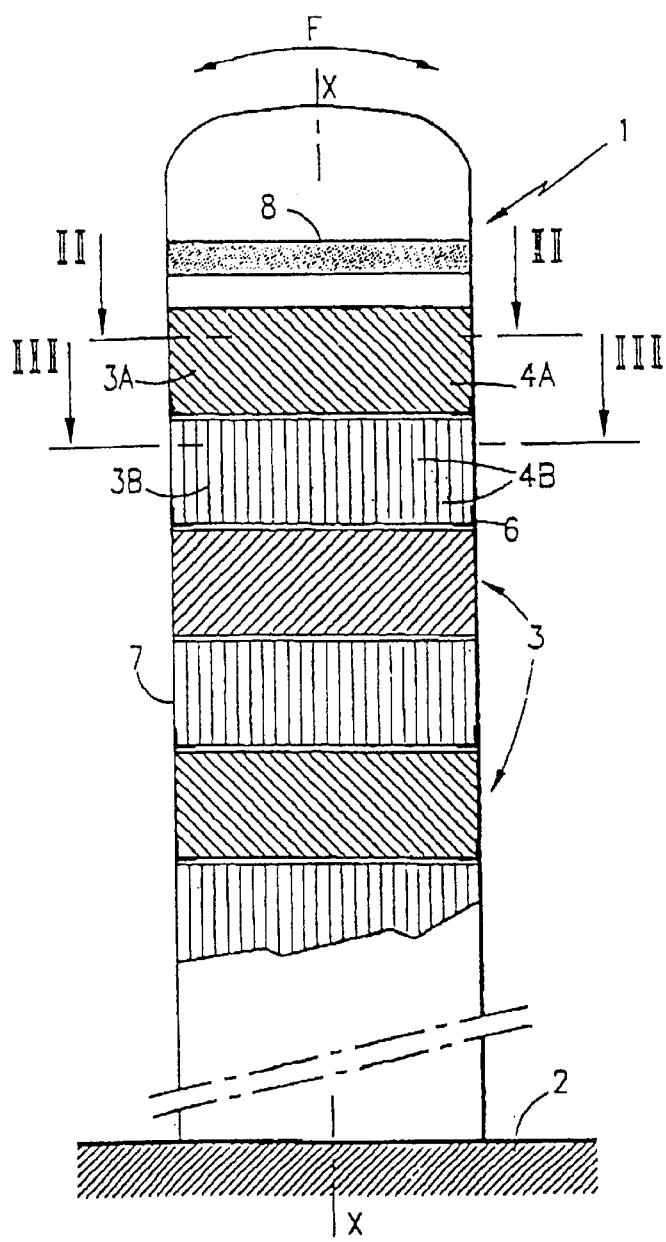
FIG. 1 depicts diagrammatically, partially an axial section, a floating offshore structure according to the invention.
Figure 2:
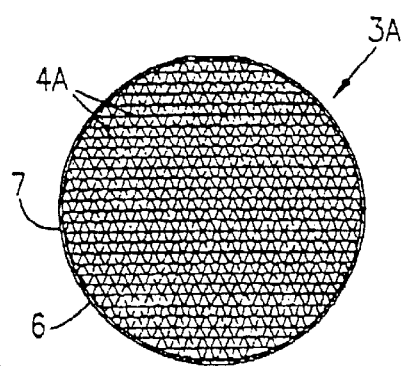
FIGS. 2 and 3 are views in section, respectively, on lines II—II and III—III of FIG. 1.
Figure 3:
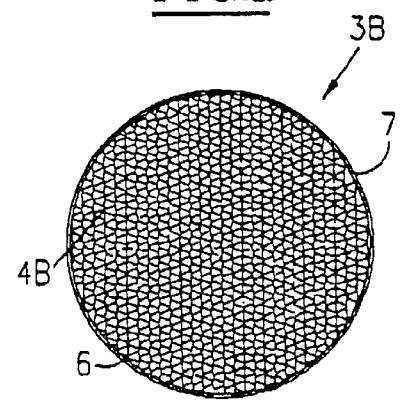
Figure 4:
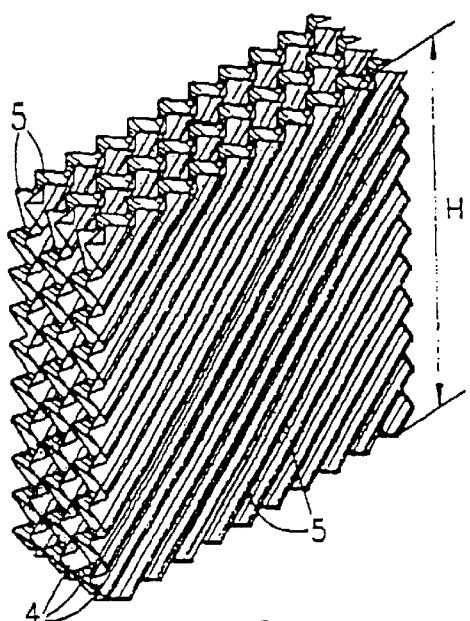
FIG. 4 depicts in perspective part of a length of cross-corrugated packing.

FIG. 1 depicts diagrammatically an air distillation column fixed to a barge or to an oil platform 2 anchored to the seabed. This barge, under the effect of the heave, oscillates with an instantaneous direction of oscillation illustrated by the double arrow F and contained in the plane of the figure. The angle i of inclination with respect to the vertical of the axis X—X of the column may reach a predetermined maximum value $i_o$ at least equal to 5°, and typically between about 5 and 10°. In this range oscillations, the column must provide satisfactory distillation.

FIGS. 1 to 4 illustrate diagrammatically the internal arrangement of the upper part of the column 1. This upper part comprises a superposition of packs or lengths 3 of cross-corrugated packing, each of which has the form of a cylindrical biscuit occupying the entire cross section of the column.

Each pack 3 (FIGS. 2 to 4) consists of a stack of corrugated strips 4 with oblique corrugations 5, these strips possibly being perforated over their entire surface. Each strip 4 has a vertical general plane, all the strips have the same height H, and the corrugations are alternately inclined in one direction and the other from one strip to the next. Thus, the corrugations of adjacent strips touch at a great many points of intersection.

There are two types of pack 3: packs 3A (FIG. 2), the strips 4A of which are assumed to be orientated parallel to the predominant direction of oscillation F, that is to say to the plane of FIG. 1, and packs 3B (FIG. 3), the strips 4B of which are orientated at right angles to the strips 4A. Each pack is supported, for example, by a peripheral section piece 6 welded to the outer shell 7 of the column.

All the packs 3 have the same number of strips 4 and the packs 3B alternate with the packs 3A, as depicted in FIG. 1. Of course, this arrangement may be repeated along the entire length of the distillation column, that is to say of the low-pressure column and of the medium-pressure column when, like in this example, the column in question is a double air distillation column.

In service, the liquid, which descends down the column, distributed at the top of the column over the entire cross section thereof by a distributor 8, flows through the successive packs. The section pieces 6 and the alternating orientation of the packs 3A and 3B allow the liquid to be redistributed at regular intervals over the entire cross section of the column.

When the axis of the column is inclined by an angle i, the distribution of the liquid in the packs 3B is virtually unaffected, because the strips 4B, being at right angles to the direction F, effectively prevent liquid from being deflected in the direction of inclination.

By contrast, in the packs 3A the inclination i, which is in the plane of the strips 4A, tends to deflect the liquid towards a vertical edge thereof, and therefore to destroy the uniformity with which the liquid is distributed through these packs, to the detriment of distillation performance. This phenomenon will now be detailed with reference to FIGS. 5 to 8.

In cross section (FIG. 6), each corrugation 5 has a triangular overall shape, with straight flanks 9 which are symmetric with respect to the vertical direction D and rounded portions 10 at the crest of the corrugations. Chain line has been used to depict the mean corrugation flanks 11 obtained by joining the successive corrugation crests. The corrugation is defined by its total height h, measured parallel to the direction D, by the angular aperture γ at the crest of the mean flanks 11, and by the radius r of the rounded portions 10.

Viewed face on (FIG. 5), each strip 4 is a rectangle, the corrugations 5 of which are inclined by an angle δ with respect to the horizontal, that is to say with respect to the upper 12 and lower 13 edges of the strip.

The strips 4 are produced by folding a flat metal starting sheet, possibly perforated, at the angle δ, by folding and/or pressing using an appropriate tool.

Figure 5:
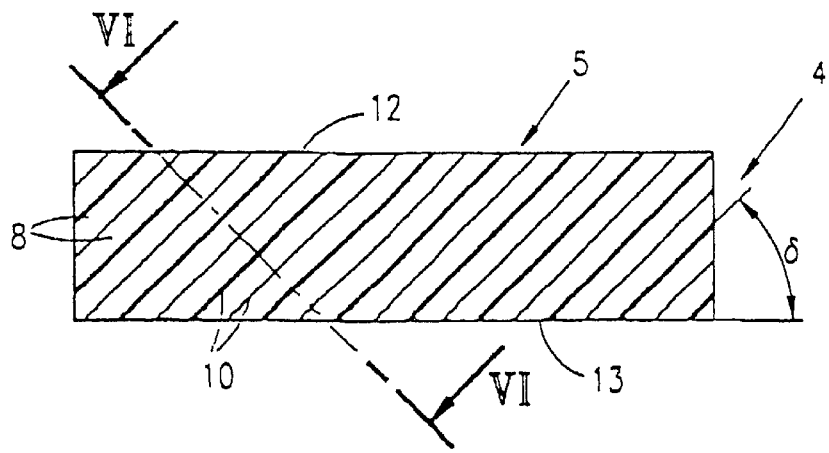
Figure 6:
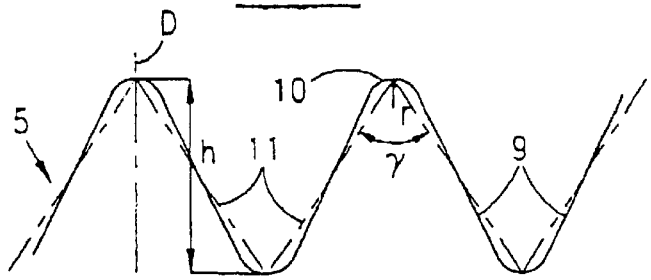
FIG. 6 depicts the shape of the corrugation of the strips of the cross-corrugated packing in section on the line VI—VI of FIG. 5.
Figure 7:
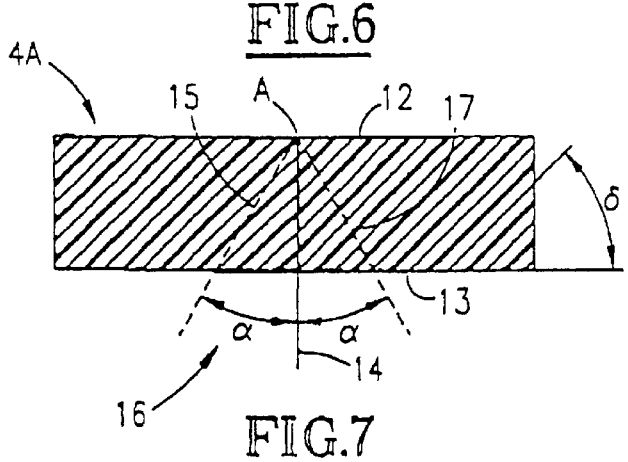
FIG. 7 illustrates the flow of a cryogenic liquid over the corrugated strip, this strip being in the non-inclined position.
Figure 8:
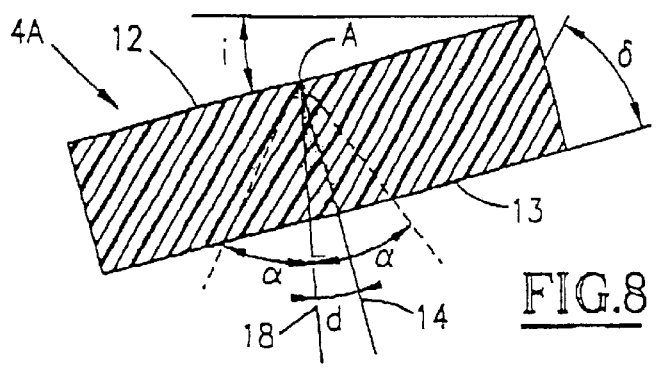
FIG. 8 illustrates the flow of the liquid when the corrugated strip is inclined in its general plane.

In the example of FIGS. 5 and 6, which is repeated in FIGS. 7 and 8, γ=60° and δ=45°.

When the axis X—X of the column 1 is vertical (i=0), the edges 12 and 13 of the strips 4A are horizontal, as depicted in FIG. 7. The liquid arriving at any point A on the upper edge 12 of a given pair of strips flow along both faces of the strips inside a flattened half-cone delimited on one side by the perpendicular 14 to the point A at the edges 12 and 13 and, on the other side, by the mean line of greatest slope 15 of the strip.

The term "mean line of greatest slope" should be understood as meaning the mean line of the broken line defined, on the one hand, by the lines of greatest slope of the successive flat corrugation flanks 9 and, on the other hand, by the short essentially vertical segments that the liquid travels when passing the rounded portions 10.

Bearing in mind the cross-corrugated structure, the liquid arriving at the pack at the point A spreads out within a flattened cone 16 defined by the line 15 and by its mirror image 17 with respect to the perpendicular 14, which is vertical. The cone vertex half angle, in the plane of the strip, is denoted α. For the particular values γ=60° and δ=45°, the angle α is close to 30°.

When the strip 4A is inclined by an angle i in its plane (FIG. 8), it can be seen that the axis 18 of the cone in which the liquid spreads out deviates towards the vertical with respect to the straight line 14, but by an angle d, known as the liquid deviation angle, which is smaller than the angle i. In addition, it can be seen that the cone aperture half angle 15 remains essentially constant and equal to the aforementioned value α.

Thus, in the example under consideration, for i=10°, d=5° approximately, and for i≦10°, d is essentially proportional to i.

It has been observed that, surprisingly, the distillation performance of the column remained satisfactory in the range 0≦i≦10° approximately when the following conditions are simultaneously satisfied:

(1) 40°≦γ≦80°

(2) 30°≦δ≦60°

(3) d/i<0.6

Conveniently, pairs of values of the angle γ and δ that satisfy relationship (3) can be determined to a sufficiently good approximation using the following relationship:

$$1 - 2\sin 2\delta \cos^2 \frac{\gamma}{2} \frac{B - \sin^2 \frac{\gamma}{2}}{2B\sqrt{B - A^2}} < 0.6, \quad (4)$$

with: $A = 1 - \cos^2 \delta \cdot \cos^2 \frac{\gamma}{2}$ and: $B = A\left(1 + \sin^2 \frac{\gamma}{2}\right) - \sin^2 \frac{\gamma}{2}$.

It has thus been possible to determine the following pairs of values which leads to satisfactory results. In the table below, the values shown in the boxes are the values of the d/i ratio that are calculated from relationship (4) above.

| γ δ | 30° | 40° | 50° | 60° |
|---|---|---|---|---|
| 40° | 0.45 | 0.28 | 0.20 | 0.16 |
| 50° | — | 0.41 | 0.30 | 0.24 |
| 60° | — | 0.56 | 0.41 | 0.33 |
| 70° | — | — | 0.52 | 0.42 |
| 80° | — | — | — | 0.52 |

As will be understood, if the distillation performance of the packs 3A, that is to say their ability to oppose the wall effect in a position inclined in the direction F, is satisfactory, the same is, by inference, true of packs in which the corrugated strips form a positive angle of less than 90° with the plane of oscillation. The column 1 may therefore be orientated in any desired manner about its axis X—X.

Of course, when the relationships mentioned earlier hold true, the distillation performance of the column is satisfactory irrespective of whether or not the floating structure has a predominant direction of oscillation.

What is claimed is:

1. A floating offshore structure, comprising:
   a floating platform with an angle of oscillation i at most equal to a predetermined value $i_o$ substantially between 5° and 10°; and
   a double air distillation column (1) carried by the floating platform,
   the distillation column comprising, over at least part of its length, a cross-corrugated packing (3),
   the cross-corrugated packing comprising a superposition of lengths of packing (3A, 3B),
   each of the lengths of packing comprising a stack of vertical corrugated strips (4A, 4B) with corrugations (5) alternately inclined in opposite directions,
   the corrugations of the strips (4A) of at least one length of packing (3A) being configured such that, for each pair of adjacent strips (4A), when the strips are inclined in their general plane by the angle i, mean lines of greatest slope (15, 17) of mean corrugation flanks (10) of two adjacent strips delimit, measuring from any point (A) on an upper edge (12) of the adjacent strips, on each side of a perpendicular (14) to the upper edge at the point (A), a flattened cone (16) with an axis (18) formed with the perpendicular (14) an angle d such that a ratio d/i is less than 0.6,
   wherein,
      each of the strips (4A) of the length (3A) have corrugations with a mean angular aperture γ, and
      the corrugations have generatrices with an inclination δ,
      $40° \leq \gamma \leq 80°$ and $30° \leq \delta \leq 60°$.

2. The structure of claim 1, wherein the floating platform is an offshore oil platform.

3. The structure of claim 1, wherein the floating platform is a barge.

4. The structure of claim 1, wherein the ratio d/i is less than 0.5.

5. A floating offshore structure, comprising:
   a floating platform with an angle of oscillation i at most equal to a predetermined value $i_o$ substantially between 5° and 10°; and
   a double air distillation column (1) carried by the floating platform,
   the distillation column comprising, over at least part of its length, a cross-corrugated packing (3),
   the cross-corrugated packing comprising a superposition of lengths of packing (3A, 3B),
   each of the lengths of packing comprising a stack of vertical corrugated strips (4A, 4B) with corrugations (5) alternately inclined in opposite directions,
   the corrugations of the strips (4A) of at least one length of packing (3A) being configured such that, for each pair of adjacent strips (4A), when the strips are inclined in their general plane by the angle i, mean lines of greatest slope (15, 17) of mean corrugation flanks (10) of two adjacent strips delimit, measuring from any point (A) on an upper edge (12) of the adjacent strips, on each side of a perpendicular (14) to the upper edge at the point (A), a flattened cone (16) with an axis (18) formed with the perpendicular (14) an angle d such that a ratio d/i is less than 0.6,
   wherein,
      each of the strips (4A) of the length (3A) have corrugations with a mean angular aperture γ, and
      the corrugations have generatrices with an inclination δ,
      $40° \leq \gamma \leq 80°$ and $30° \leq \delta \leq 60°$, and
      the mean angular aperture γ of each of the strips (4A) of the length (3A) and the inclination δ of the generatrices of the corrugations, when viewed face on, are connected by the relationship $$1 - 2\sin 2\delta \cos^2(\gamma/2) * \frac{B - \sin^2(\gamma/2)}{2B\sqrt{B - A^2}} < 0.6,$$

with $A = 1 - \cos^2 \delta \cdot \cos^2(\gamma/2)$ and $B = A(1 + \sin^2(\gamma/2)) - \sin^2(\gamma/2)$.

6. The floating offshore structure according to claim 5, wherein,
   the mean angular aperture γ of each of the strips (4A) of the length (3A), and
   the inclination δ of the generatrices of the corrogations, when viewed face on, are connected by the relationship $$1 - \sin 2\delta \cos^2(\gamma/2) * \frac{B - \sin^2(\gamma/2)}{2B\sqrt{B - A^2}} < 0.5.$$

7. A floating offshore structure, comprising:
   a floating platform with an angle of oscillation i at most equal to a predetermined value $i_o$ substantially between 5° and 10°; and
   a double air distillation column (1) carried by the floating platform, the distillation column comprising, over at least part of its length, a cross-corrugated packing (3), the cross-corrugated packing comprising a superposition of lengths of packing (3A, 3B), each of the lengths of packing comprising a stack of vertical corrugated strips (4A, 4B) with corrugations (5) alternately inclined in opposite directions, the corrugations of the strips (4A) of at least one length of packing (3A) being configured such that, for each pair of adjacent strips (4A), when the strips are inclined in their general plane by the angle i, mean lines of greatest slope (15, 17) of mean corrugation flanks (10) of two adjacent strips delimit, measuring from any point (A) on an upper edge (12) of the adjacent strips, on each side of a perpendicular (14) to the upper edge at the point (A), a flattened cone (16) with an axis (18) formed with the perpendicular (14) an angle d such that a ratio d/i is less than 0.6, wherein,
each of the strips (4A) of the length (3A) have corrugations with a mean angular aperture γ of substantially 40°, and
the corrugations have generatrices with an inclination δ substantially between 30° and 60°.

8. The floating offshore structure of claim 7, wherein,
the corrugations have generatrices with an inclination δ between substantially 40° and 60°.

9. A floating offshore structure, comprising:
a floating platform with an angle of oscillation i at most equal to a predetermined value $i_o$ substantially between 5° and 10°; and
a double air distillation column (1) carried by the floating platform, the distillation column comprising, over at least part of its length, a cross-corrugated packing (3), the cross-corrugated packing comprising a superposition of lengths of packing (3A, 3B), each of the lengths of packing comprising a stack of vertical corrugated strips (4A, 4B) with corrugations (5) alternately inclined in opposite directions, the corrugations of the strips (4A) of at least one length of packing (3A) being configured such that, for each pair of adjacent strips (4A), when the strips are inclined in their general plane by the angle i, mean lines of greatest slope (15, 17) of mean corrugation flanks (10) of two adjacent strips delimit, measuring from any point (A) on an upper edge (12) of the adjacent strips, on each side of a perpendicular (14) to the upper edge at the point (A), a flattened cone (16) with an axis (18) formed with the perpendicular (14) an angle d such that a ratio d/i is less than 0.6, wherein,
each of the strips (4A) of the length (3A) have corrugations with a mean angular aperture γ of substantially 50°, and
the corrugations have generatrices with an inclination δ substantially between 40° and 60°.

10. The floating offshore structure of claim 9, wherein,
the corrugations have generatrices with an inclination δ between substantially 50° and 60°.

11. A floating offshore structure, comprising:
a floating platform with an angle of oscillation i at most equal to a predetermined value $i_o$ substantially between 5° and 10°; and
a double air distillation column (1) carried by the floating platform, the distillation column comprising, over at least part of its length, a cross-corrugated packing (3), the cross-corrugated packing comprising a superposition of lengths of packing (3A, 3B), each of the lengths of packing comprising a stack of vertical corrugated strips (4A, 4B) with corrugations (5) alternately inclined in opposite directions, the corrugations of the strips (4A) of at least one length of packing (3A) being configured such that, for each pair of adjacent strips (4A), when the strips are inclined in their general plane by the angle i, mean lines of greatest slope (15, 17) of mean corrugation flanks (10) of two adjacent strips delimit, measuring from any point (A) on an upper edge (12) of the adjacent strips, on each side of a perpendicular (14) to the upper edge at the point (A), a flattened cone (16) with an axis (18) formed with the perpendicular (14) an angle d such that a ratio d/i is less than 0.6, wherein,
each of the strips (4A) of the length (3A) have corrugations with a mean angular aperture γ of substantially 60°, and
the corrugations have generatrices with an inclination δ substantially between 40° and 60°.

12. The floating offshore structure of claim 11, wherein,
the corrugations have generatrices with an inclination δ between substantially 50° and 60°.

13. A floating offshore structure, comprising:
a floating platform with an angle of oscillation i at most equal to a predetermined value $i_o$ substantially between 5° and 10°; and
a double air distillation column (1) carried by the floating platform, the distillation column comprising, over at least part of its length, a cross-corrugated packing (3), the cross-corrugated packing comprising a superposition of lengths of packing (3A, 3B), each of the lengths of packing comprising a stack of vertical corrugated strips (4A, 4B) with corrugations (5) alternately inclined in opposite directions, the corrugations of the strips (4A) of at least one length of packing (3A) being configured such that, for each pair of adjacent strips (4A), when the strips are inclined in their general plane by the angle i mean lines of greatest slope (15, 17) of mean corrugation flanks (10) of two adjacent strips delimit, measuring from any point (A) on an upper edge (12) of the adjacent strips, on each side of a perpendicular (14) to the upper edge at the point (A), a flattened cone (16) with an axis (18) formed with the perpendicular (14) an angle d such that a ratio d/i is less than 0.6, wherein,
each of the strips (4A) of the length (3A) have corrugations with a mean angular aperture γ of substantially 70°, and
the corrugations have generatrices with an inclination δ substantially between 50° and 60°.

14. The floating offshore structure of claim 13, wherein,
the corrugations have generatrices with an inclination δ of substantially 60°.

15. A floating offshore structure, comprising:
a floating platform with an angle of oscillation i at most equal to a predetermined value $i_o$ substantially between 5° and 10°; and a double air distillation column (1) carried by the floating platform, the distillation column comprising, over at least part of its length, a cross-corrugated packing (3), the cross-corrugated packing comprising a superposition of lengths of packing (3A, 3B), each of the lengths of packing comprising a stack of vertical corrugated strips (4A, 4B) with corrugations (5) alternately inclined in opposite directions, the corrugations of the strips (4A) of at least one length of packing (3A) being configured such that, for each pair of adjacent strips (4A), when the strips are inclined in their general plane by the angle i, mean lines of greatest slope (15, 17) of mean corrugation flanks (10) of two adjacent strips delimit, measuring from any point (A) on an upper edge (12) of the adjacent strips, on each side of a perpendicular (14) to the upper edge at the point (A), a flattened cone (16) with an axis (18) formed with the perpendicular (14) an angle d such that a ratio d/i is less than 0.6, wherein, each of the strips (4A) of the length (3A) have corrugations with a mean angular aperture $\gamma$ of substantially 80°, and the corrugations have generatrices with an inclination $\delta$ of substantially 60°.

* * * * *